United States Patent [19]

Sakuragi et al.

[11] 4,381,141

[45] Apr. 26, 1983

[54] INFRARED OPTICAL FIBER AND METHOD FOR MANUFACTURE THEREOF

[75] Inventors: Shiro Sakuragi; Haruo Kotani, both of Kisshoinmiya-no-Higashimachi, Japan

[73] Assignees: Agency of Industrial Science & Technology; Ministry of International Trade & Industry, both of Tokyo, Japan

[21] Appl. No.: 225,743

[22] Filed: Jan. 16, 1981

[30] Foreign Application Priority Data

Jan. 22, 1980 [JP] Japan ..................................... 55/5315

[51] Int. Cl.³ .............................................. G02B 5/14
[52] U.S. Cl. .................................. 350/96.34; 350/96.1; 350/96.29; 65/3.3
[58] Field of Search ................... 350/96.1, 96.2, 96.21, 350/96.23, 96.29, 96.34, 96.3, 96.31, 96.33, 96.28; 65/3.1, 3.3, 4.21

[56] References Cited

U.S. PATENT DOCUMENTS 3,778,132 12/1973 Pinnow et al. ................... 350/96.3
4,114,980 9/1978 Asam et al. ...................... 350/96.33
4,253,731 3/1981 Anderson et al. ............. 350/96.3 X

*Primary Examiner*—Marvin L. Nussbaum
*Attorney, Agent, or Firm*—Oblon, Fisher, Spivak, McClelland & Maier

[57] ABSTRACT

A preform is prepared to comprise a step index structure consisting of a core and a clad both made of metal halogenides or arsenic-selenium glass sparingly capable of transmitting infrared light of long wavelength and a layer of lubricant applied to the outer surface of the clad. The preform is set inside a metal cylinder. By pulling this metal cylinder through a plurality of dies containing orifices of successively decreased diameters at a temperature below the melting point, the preform can be elongated into an optical fiber of a prescribed diameter. The optical fiber thus produced is capable of transmitting infrared light of high power with a small loss. Protected and reinforced by the metal cylinder jacket, this fiber enjoys high mechanical strength.

12 Claims, 6 Drawing Figures

INFRARED OPTICAL FIBER AND METHOD FOR MANUFACTURE THEREOF

BACKGROUND OF THE INVENTION

This invention relates to an infrared optical fiber capable of transmitting a high-output laser light, particularly a laser light in the infrared region, with a small loss and to a method for the manufacture of the optical fiber.

In recent years, there have been great advances in the research and development of machines and equipment making use of laser lights. In industrial fields, laser lights have found widespread acceptance in optical communication and the manufacture of various shaped articles. In the field of medical instruments, adoption of laser lights as optical scalpels or for eliminating skin blemishes has already been realized. Of the various forms of lasers, the $CO_2$ laser has a very large proportion of light energy in the infrared region of about $10\mu$. This wavelength falls in the range of infrared absorption by water. This $CO_2$ laser, therefore, is highly effective in cutting water-containing materials such as paper and fabrics and living tissue. Further, in the semiconductor industry, the $CO_2$ laser is used such as for silane-gas thermal decomposition during the annealing of silicon substrates and the formation of LSI circuits. In the field of office machines, it is utilized as a high-speed printing means. In these applied devices, the laser light is generally led to the objects under treatment by means of reflecting mirrors. In these applications, therefore, if a device is developed for transmitting infrared laser lights via a flexible fiber instead of reflecting mirrors, the device can be expected to simplify various laser machines and facilitate their operation. In the meantime, there has appeared a general trend toward adopting increasingly greater wavelengths in optical communication. Also in this area the development of an infrared optical fiber is strongly needed. From the practical point of view, however, manufacture of an infrared optical fiber capable of safely transmitting high-energy infrared laser lights is extremely difficult.

Assumed, for example, that a step index structure optical fiber of glass material such as quartz glass, hign-silica-content glass or soda lime glass which has already been established in optical communication technology is adopted as a medium for the transmission of infrared laser lights. The light transmissivity of such glass type optical fiber is, however, limited to infrared rays with wavelengths up to 2 or 3 $\mu$m. On the other hand, when the infrared ray to be passed through the optical fiber possesses a high power, it is apt to be desirable to fix the wavelength in the neighborhood of 1.5 $\mu$m in order to prevent heat buildup and burn-out due to the absorption loss of the optical fiber and to assure the expected efficiency of energy output from the optical fiber. This means, in short, that the $CO_2$ laser cannot be applied to this kind of optical fiber.

The step index structure optical fiber made of an infrared transmitting substance such as a metal halogenide or arsenic selenium glass is capable of transmitting infrared rays of a greater wavelength on the order of 10 $\mu$m with high efficiency. It is nevertheless extremely difficult to manufacture an optical fiber of this kind having a practical capacity tolerance. Since the infrared transmitting substance mentioned above is seriously deprived of its viscosity at its melting point, the fabrication technique of fibers (for fabrication of fibers with a preform at the melting point until a prescribed diameter is obtained) which is adopted generally in the production of glass fibers for communication is no longer capable of forming a smooth interface between the core and the clad, making the manufacture of a step index structure optical fiber impossible.

To overcome this difficulty, there has been tried a method which comprises preparing a preform (matrix) of a core material of a metal halogenide suitable for infrared optical transmission and forcibly extruding this preform through the orifice of a die at a temperature below the melting point thereby obtaining an optical fiber of a prescribed diameter. Since the softened preform is passed through the orifice of the die under application of pressure, the inner pressure generated in the extruded fiber causes irregular flow deformation in the radial direction. When this method is used in the preform of a step index structure, the slidability of the interface between the core and the clad is impaired. In the optical fiber wherein the interface is disturbed as described above, the efficiency of light transmission is degraded. Besides, the light which is scattered by the irregular interface may deviate from the boundary of the fiber and, in an extreme case, burn the clad on the fiber.

There has been conceived the idea of extrusion molding a core alone and subsequently inserting this core into a cladding material separately extrusion molded thereby producing a clad core type infrared optical fiber. In this case, the number of steps involved in the manufacture is increased, lowering the efficiency of the production operation. Moreover, it is very difficult to insert a core of a very small diameter on the order of several microns accurately within a clad and to continue this insertion of the core without the friction between the core and the clad causing any harm to the surface of the core. When the core surface sustains scratches due to the friction, then the produced clad core suffers from the same scattering loss as described above.

For the reasons described above, the infrared optical fiber made of an infrared transmitting substance such as a metal halogenide or arsenic selenium glass is impracticable despite its theoretical possibility. As means for the transmission of high-power infrared laser lights such as those produced by carbon dioxide gas laser, therefore, an optical system making effective use of reflecting mirrors has so far been adopted.

SUMMARY OF THE INVENTION

An object of this invention is to provide an optical fiber capable of transmitting a high-power infrared laser light safely with a small loss and a method for efficient manufacture of the optical fiber.

To accomplish the object described above according to the present invention, there is provided an optical fiber which is produced by preparing a preform of a core and a clad both of infrared transmitting substances, applying a lubricating to the outer surface of the preform, vacuum sealing the preform within a metal pipe, and passing the metal pipe through a die at a temperature below the melting point of the aforementioned preform.

The preform can easily be drawn into an optical fiber of a prescribed cross-sectional area by causing the preform as held inside the metal pipe to be passed through a plurality of dies having successively decreasing orifices. According to this method, the interface formed with highly smooth interface between the core and the clad of the preform is preserved intact until after the preform has been drawn into the optical fiber. Thus, the optical fiber possesses a very smooth interface. Besides, the metal pipe which has been drawn simultaneously with the preform will function as a protective jacket for the produced optical fiber.

The other objects and characteristics of the present invention will become apparent from the further disclosure of this invention to be made hereinafter with reference to the accompanying drawing.

DESCRIPTION OF THE PREFERRED EMBODIMENT

This invention relates to an optical fiber of step index structure comprising a core and a clad each made of highly transparent substances in the infrared region and capable of transmitting infrared rays with high efficiency, and to a method for the manufacture of the optical fiber.

Figure 1:
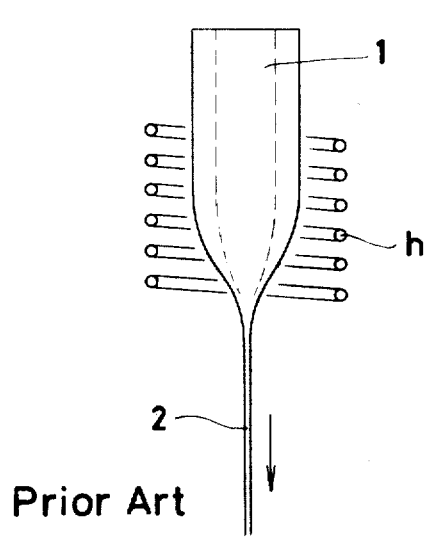
FIG. 1 is a schematic explanatory diagram of a device for the manufacture of a conventional glass fiber.

The drawing method illustrated in FIG. 1 is a typical example of the various methods available for the manufacture of a glass optical fibers. As illustrated, this method obtains an optical fiber 2 by thermally fusing a preform 1 of a proper thickness with a heater h and drawing the molten preform until it assumes a prescribed diameter. This method has an advantage that a long optical fiber can be produced rather easily. This method also proves to be an effective means of producing a step index structure optical fiber consisting of a core and a clad and enjoying low transmission loss for the optical communication. To be more specific, a step index structure preform is prepared from quartz glass or boron-silica glass which exhibits outstanding properties in the transmission of near infrared rays or visible rays to be used for optical communication, and this preform is drawn at a temperature below the melting point of the substance. Since such a substance suffers little degradation in viscosity even when it is fused at an elevated temperature, the smoothness of the interface formed with high accuracy between the core and the clad in the preform is preserved intact even after the preform has been adequately drawn.

The glass type substance which is used in this optical fiber, however, has a disadvantage that it exhibits poor transmissivity to infrared rays of a long wavelength in the neighborhood of 10 $\mu$m and, to make the matter worse, induces heat buildup in the optical fiber.

It is now assumed that a step index structure optical fiber consisting of a core and a clad is made of a metal halogenide or arsenic selenium glass, a substance which exhibits high transmissitivity to infrared ray, by the aforementioned drawing method. Since the substance is deprived of its viscosity when it is converted into a fused state, the interface between the core and the clad is disturbed and the smoothness of the interface is seriously impaired. Thus, the drawing method is not suitable for the manufacture of a step index structure optical fiber.

Figure 2:
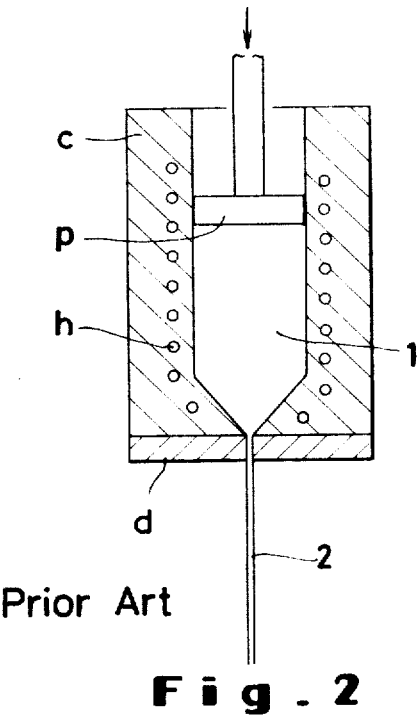
FIG. 2 is a schematic explanatory diagram of a device for the manufacture of a conventional infrared optical fiber.
Figure 3:
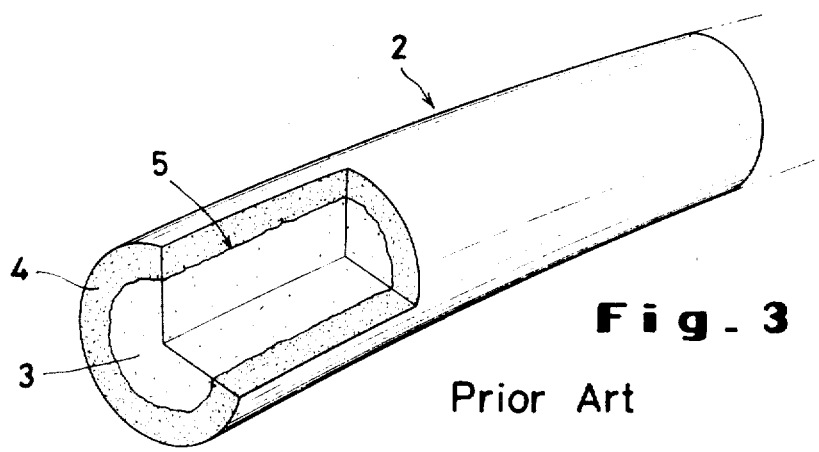
FIG. 3 is a partially cutaway perspective view of a step index structure fiber obtained by the device of FIG. 2.

In these circumstances, there is no alternative but to manufacture an optical fiber capable of transmitting infrared rays by the other method available for the production of optical fibers, namely the extrusion method (FIG. 2). For example, a step index structure preform 1 made of a metal halogenide is placed in a cylinder c of an extruding machine, heated with a heater h to a temperature 100° to 200° C. lower than the melting point of the metal halogenide and passed through an orifice of the die d by lowering the piston p under a high pressure. As a result, there is obtained an optical fiber 2 having a diameter substantially equaling the diameter of the orifice. Strictly, however, since the preform 1 within the cylinder c is subject to the high pressure exerted on the piston, the portion of the preform which has passed through the orifice still retains a slight degree of inner pressure. As a result, the remaining inner pressure causes flow deformation within the fiber formed after the orifice and impairs the smoothness of the interface 5 between the core 3 and the clad 4 as illustrated in FIG. 3.

When an optical ray is injected into an optical fiber which possesses such a rough interface as mentioned above, the ray is dispersed by the interface and consequently is caused to leak outside the clad. If the ray happens to possess high energy, the ray thus leaking through the clad can burn the clad of the optical fiber or an object located near the optical fiber. Such an optical fiber may be unsafe for use an living organisms.

As described above, the drawing method and the extrusion method are not suitable for the production of infrared optical fibers. None of the methods so far proposed for the production of infrared optical fibers have proved to be fully practicable.

This invention permits production of an optical fiber capable of transmitting infrared rays with high efficiency without entailing any of the disadvantages involved in the manufacture of optical fibers by the conventional methods. Now, the method of this invention for the manufacture of the optical fiber will be described in detail.

Figure 4:
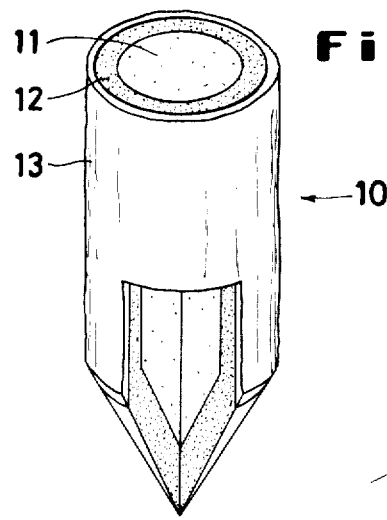
FIG. 4 is a partially cutaway perspective view of the structure of a preform applicable to the present invention.

First, a preform 10 illustrated in FIG. 4 is prepared. The preform 10 in the present embodiment is produced in a step index structure and consists of a core 11 made of a metal halogenide of a low index of refraction and a clad 12 made of a metal halogenide of a low index of refraction, with a lubricating layer 13 applied to the outer surface of the clad. The clad and the core are coaxially formed. Here, the core and the clad can be combined into one unit by the known method; i.e. by a procedure comprising the steps of forming a core material and a cladding material separately of each other, boring a cylindrical hole through the cladding material with a boring machine, and then inserting the core material into the cylindrical hole in the cladding material. The preform of the present invention differs from that of the conventional method in respect that the preform of this invention incorporates an additional layer of lubricant as described above.

Of the substances including the elements of Groups Ia, Ib and III, those enumerated below are usable as metal halogenides in forming the core and the clad in the optical fiber of the present embodiment. By selecting two substances from those listed below and using the one of them having a higher index of refraction as the material for the core and the other having a lower index of refraction as the material for the clad. For example, the core 11 may be made of AgBr and the clad 12 made of AgCl.

Group Ia: LiF, NaCl, KCl, KBr, NaI and CsI
Group Ib: AgBr, AgCl and AgI
Group III: KRS-5, KRS-6, TlBr, TlCl and TlI Other than the metal halogenides enumerated above, semiconductive substances such as ZnSe and ZnTe and calcogenites such as arsenic-selenium glass may be used as infrared transmitting substances.

As the lubricating 13, a fluorine type resin such as Teflon, a fluorine type polyolefin, a polyolefin polymer such as polyethylene or boron nitrides can be used in a solid or powder form. Where either the core material 11 or the cladding material 12 is made of a substance of Group Ia, since the melting point of the substance (600° to 900° C.) is much higher than the melting point of the aforementioned polymer (150° to 250° C.), the polymer cannot be used as the lubricating layer. When the materials for the core and the clad are selected from the substances of Group Ib or Group III (having melting points in the neighborhood of 450° C.), either the polymer or the powder lubricating may be used for the lubricating layer 13. When the materials are selected from the substances of Group Ia, since the aforementioned polymer is decomposed when it is softened by heating, it is desirable to adopt a lubricant such as BN.

Figure 5:
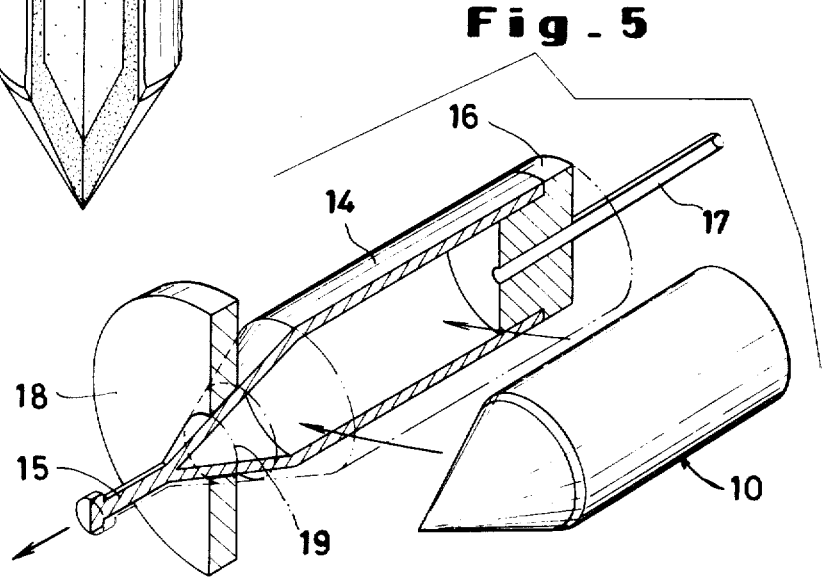
FIG. 5 is a partially cutaway perspective view illustrating the process of manufacture of the optical fiber of the present invention.
Figure 6:
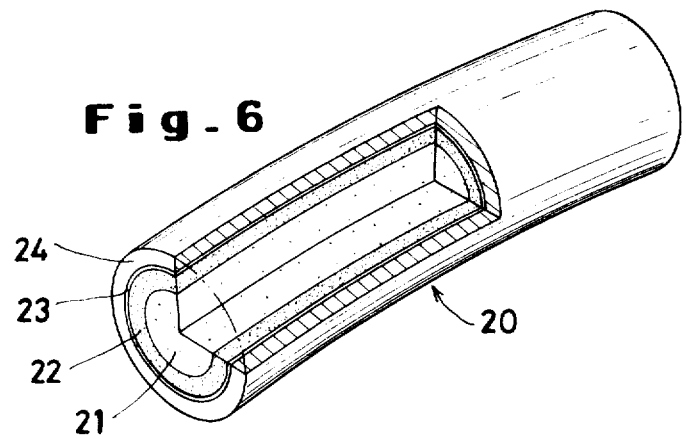
FIG. 6 is a partially cutaway perspective view illustrating the structure of an optical fiber of the present invention.

Now, the method by which the infrared optical fiber of this invention is manufactured will be described with reference to FIG. 5.

The preform 10 described above is set in position within a metal cylinder 14 which is tapered toward one end thereof and is provided at the tip of the tapered end with a portion 15 to be caught with a tool. Examples of metal material suitable for the production of this metal cylinder 14 include OFHC-copper and pure aluminum which have high ductility. After the preform has been set in position within the metal cylinder 14, the opening at the rear end of the metal cylinder is tightly stoppered with a plug 16 pierced with a pipe 17 serving as an air vent. Then, the air inside the metal cylinder 14 is evacuated via the pipe 17 and the pipe 17 is closed at a proper portion to keep the interior of the metal cylinder in the state of a vacuum. Then, with a proper tool (not shown) hooked fast on the grip portion 15 of the metal cylinder 14, the metal cylinder 14 is pulled through a die 18 containing a first orifice 19 of a diameter smaller than the outer diameter of the metal cylinder 14. As the metal cylinder is thus squeezed through the orifice, the preform inside the metal cylinder is similarly elongated with contraction of diameter. If, at this time, the lubricating layer is absent between the metal cylinder and the preform, the friction between the two articles is so large that the force exerted in the direction of contracting the diameter of the preform will increase so much as to induce irregular deformation of the cylinder in the radial direction. Since the lubricating layer is present, however, the pressure is exerted semi-statically upon the preform, with the result that the preform will be elongated with the smoothness of the interface retained unimpaired. After the metal cylinder containing the preform has been forced through the orifice of the first die, it is now passed through the second die (not shown) containing an orifice of a diameter smaller than the diameter of the orifice in the first die by following the same procedure. In this manner, the elongation of the metal cylinder and the preform is repeated by using dies containing successively smaller orifices until the outer diameter of the metal cylinder is decreased to a prescribed size. In earlier dies, the diameters of the orifices are successively decreased by about 10 to 20%. When the diameter of the metal cylinder has been decreased to a certain extent, the diameters of the orifices in the dies used thereafter are successively decreased by 50 to 90%. Thus, the metal cylinder assumes the prescribed thickness by the time it has passed through the orifice in the last die.

By the pulling method described above, a preform made of metal halogenides which have defied accurate molding by the conventional method can be elongated into an optical fiber which retains the smoothness of the core-clad interface intact.

Further, since the optical fiber 20 which is obtained by the pulling method described above is provided, on the thin layer of lubricant 23 surrounding the outer surface of the step index structure of the core 21 as the light path and the clad 22, with a metal cylinder jacket 24, it enjoys a mechanical strength and a structure ideal as a medium for transmission of light in various applications. Moreover, the lubricating layer which is used in this pulling method serves not merely to decrease the frictional resistance between the clad and the metal cylinder during the passage of the metal cylinder through the dies and to facilitate the smooth progress of the elongation but also to prevent the clad 22 of highly reactive metal halogenide in the produced optical fiber from coming into direct contact with the jacket 24 and consequently causing corrosion of the jacket. The lubricant is laid along the inside of the metal cylinder. Even if the temperature is elevated during the elongation, the metal cylinder made of copper or aluminum which is quite susceptible to corrosion has no possibility of being corroded by the lubricant or the halogenide used in the core or clad because the interior of the metal cylinder is retained in the state of a vacuum.

The pulling involved in the present method is performed cold, namely at a temperature lower (by 100° to 200° C., for example) than the melting point of the metal halogenide used in the core or clad. Insofar as this temperature condition is satisfied, the pulling may take place at room temperature. Otherwise, the temperature may be suitably elevated by use of a heater. The interface formed between the core material and the cladding material in the preform is retained undisturbed and preserved in its original smooth state in the finally produced optical fiber because this pulling is performed by use of a plurality of dies provided with orifices of successively decreased diameters. Further because the air in the metal cylinder 14 is evacuated before the pulling and the interior of the metal cylinder is retained in the state of a vacuum throughout the entire process of drawing, the possibility of air bubbles remaining between the clad and the metal cylinder and doing harm to the outer surface of the clad or to the interface between the core and the clad.

According to the present invention, a step index structure optical fiber consisting of a core and a clad both made of metal halogenides or arsenic-selenium glass, namely infrared transmitting substances, with high efficiency without impairing the smoothness of the interface between the core and the clad. The optical fiber thus produced is capable of transmitting an infrared ray of long wavelength with a small loss. Further since the optical fiber is provided with a metal jacket which serves to protect and reinforce the core and the clad, it can safely transmit an infrared laser of high energy. Thus, it can be adopted in a surgical scalpel designed to operate with an infrared ray of high energy.

What is claimed is:

1. An infrared optical fiber, comprising a core made of an infrared transmitting substance, a clad around said core made of a infrared transmitting substance having a lower index of refraction then said core, a layer of lubricant on the outer surface of said clad, and a metal pipe enveloping said layer of lubricant.

2. The optical infrared fiber according to claim 1, wherein said core and said clad are made of substances selected from the group consisting of metal halogenides and arsenic-selenium glass.

3. The infrared optical fiber according to claim 1 or claim 2, wherein said layer of lubricant is made of boron nitride or a substance selected from the group consisting of fluorine type resins, fluorine type polyolefins and polyolefins.

4. The infrared optical fiber according to claim 1, wherein the metal pipe is made of OFHC-copper or pure aluminum.

5. A method for the manufacture of an infrared optical fiber, which comprises the steps of preparing a preform composed of a core made of an infrared transmitting substance, a clad around said core made of an infrared transmitting substance having a lower index of refraction than said core, and a layer of lubricant on the outer surface of said clad, placing said preform within a metal cylinder, sealing it airtightly therein, and forcing said metal cylinder containing said preform therein through dies at a temperature lower than the melting points of said core and said clad.

6. The method according to claim 5, wherein said metal cylinder is completely closed at one end and opened at the other end, and, after said preform has been placed within the metal cylinder, the open end of the metal cylinder is closed with a plug provided with a pipe for venting of air, the air inside the metal cylinder is evacuated through the pipe so as to keep the interior of the metal cylinder in the state of a vacuum.

7. The method according to claim 5, wherein the metal cylinder is gradually contracted in diameter by use of a plurality of dies having orifices of successively decreased diameters.

8. The method according to claim 7, wherein the metal cylinder is gradually elongated to a prescribed diameter by passing the metal cylinder through a plurality of dies having orifices which are successively decreased by 10 to 20%.

9. The method according to claim 5, wherein said core and said clad are made of substances selected from the group consisting of metal halogenides and arsenic-selenium glass.

10. The method according to claim 5, wherein said layer of lubricant is made of one substance selected from the group consisting of fluorine type resins, fluorine type polyolefins and polyolefins.

11. The method according to claim 5, wherein said layer of lubricant is made of boron nitride.

12. The method according to claim 5, claim 7 or claim 8, wherein the pulling of the metal cylinder through the dies is carried out at a temperature lower by 100° to 200° C. than the lower of the melting points of the materials of said core and said clad.

* * * * *